(12) United States Patent
Stolzer et al.

(10) Patent No.: US 12,042,872 B2
(45) Date of Patent: Jul. 23, 2024

(54) METHOD FOR PREDICTING THE REMAINING SERVICE LIFE OF A SAW BAND, AND BANDSAW MACHINE

(71) Applicant: KEURO Besitz GmbH & Co. EDV-Dienstleistungs KG, Achern (DE)

(72) Inventors: Armin Stolzer, Baden-Baden (DE); Sonke Florian Krebber, Baden-Baden (DE)

(73) Assignee: KEURO Besitz GmbH & Co. EDV—Dienstleistungs KG, Achern (DE)

( * ) Notice: Subject to any disclaimer, the term of this patent is extended or adjusted under 35 U.S.C. 154(b) by 386 days.

(21) Appl. No.: 17/349,131

(22) Filed: Jun. 16, 2021

(65) Prior Publication Data
US 2021/0394289 A1    Dec. 23, 2021

(30) Foreign Application Priority Data

Jun. 18, 2020  (DE) .......................... 102020116150.6

(51) Int. Cl.
| | |
|---|---|
| *B23D 59/00* | (2006.01) |
| *B23D 55/10* | (2006.01) |
| *B23Q 17/09* | (2006.01) |
| *G01B 21/06* | (2006.01) |
| *G08B 21/18* | (2006.01) |

(52) U.S. Cl.
CPC ........... *B23D 59/001* (2013.01); *B23D 55/10* (2013.01); *B23Q 17/0995* (2013.01); *G01B 21/06* (2013.01); *G08B 21/182* (2013.01); *B23Q 2717/00* (2013.01)

(58) Field of Classification Search
CPC .. B23D 59/001; B23D 55/10; B23Q 17/0995; B23Q 2717/00; G01B 21/06; G08B 21/182
See application file for complete search history.

(56) References Cited

U.S. PATENT DOCUMENTS

| | | | | |
|---|---|---|---|---|
| 4,289,053 | A * | 9/1981 | Sawamura | ........... B23D 55/084 83/62.1 |
| 6,105,466 | A * | 8/2000 | Oppliger | ................ B23D 63/18 76/27 |
| 2015/0158097 | A1 | 6/2015 | Myrfield | |
| 2015/0309061 | A1 | 10/2015 | Huang et al. | |

(Continued)

FOREIGN PATENT DOCUMENTS

| | | |
|---|---|---|
| CN | 105094077 | 11/2015 |
| DE | 102015119699 | 5/2017 |

(Continued)

*Primary Examiner* — Ryan D Walsh
(74) *Attorney, Agent, or Firm* — Volpe Koenig

(57) ABSTRACT

A method for predicting the remaining service life of a saw band in a bandsaw machine, in which a behavior or properties of the saw band clamped in the sawing machine are monitored by at least one sensor during operation of the sawing machine. Changes in the behavior or in properties of the saw band over time established on the basis of measurement signals of the sensor device are used for making a prediction about the time at which a band will break. The behavior or properties of the saw band are indirectly monitored using the at least one sensor device by way of detecting changes to components of the sawing machine which are operatively connected to the saw band.

11 Claims, 4 Drawing Sheets

(56) References Cited

U.S. PATENT DOCUMENTS

2020/0379432 A1\* 12/2020 Huang .................. B23Q 17/09
2023/0083373 A1\* 3/2023 Maier .................. B23D 59/001
83/72

FOREIGN PATENT DOCUMENTS

| | | |
|---|---|---|
| DE | 202017103056 | 8/2018 |
| DE | 102018118369 | 1/2020 |
| EP | 0376257 | 7/1990 |
| JP | S61279422 | 12/1986 |
| JP | H01257510 | 10/1989 |
| JP | 03221355 | 9/1991 |
| JP | H06226528 | 8/1994 |
| JP | 2905237 B2 \* | 6/1999 |
| JP | 2003340684 A | 12/2003 |
| JP | 2005081450 | 3/2005 |
| JP | 2005219160 | 8/2005 |
| JP | 2019093469 | 6/2019 |
| WO | 2018229870 A1 | 12/2018 |

\* cited by examiner

METHOD FOR PREDICTING THE REMAINING SERVICE LIFE OF A SAW BAND, AND BANDSAW MACHINE

The following documents are incorporated herein by reference as if fully set forth: German Patent Application No. 10 2020 116 150.6, filed Jun. 18, 2020.

TECHNICAL FIELD

The invention relates to a method for predicting the remaining service life of a saw band in a bandsaw machine and to a bandsaw machine comprising a saw band running around at least two running wheels and tensioned between them and comprising a tensioning device for the saw band, which tensioning device acts on at least one of the running wheels and holds the tension of the saw band substantially constant by way of changing the distance between the running wheels.

A method of the present type allows the remaining service life of the saw band of a bandsaw machine to be predicted by way of the behavior or selected properties of the saw band clamped in the sawing machine being monitored by means of at least one sensor device during operation of the sawing machine. Changes in the behavior or in the selected properties of the saw band over time can be established on the basis of measurement signals from the sensor device, and such changes are used for making a prediction about the probable or earliest time at which a band will break.

In a bandsaw machine of the present type, the revolving saw band has to be tensioned in order to be able to achieve a satisfactory sawing result. The saw band, which runs around at least two, typically precisely two, running rollers, is tensioned by means of an adjustable running wheel, i.e. after the saw band is placed on the running wheels, the adjustable running wheel is moved outward in order to tension the saw band. Particularly in the case of metal saws, the band tension has to be placed under a relatively high mechanical load due to the high cutting resistance of the workpieces.

BACKGROUND

During operation, the saw band is subject to high mechanical stresses, in particular on account of the alternating bending load during deflection of the saw band around the running wheels under tension. Since the plane of the desired saw cut in the workpiece is generally not parallel to the axles of the running wheels, the saw band, starting from the running wheel, furthermore has to be rotated into the cutting plane and, after leaving the cutting region, rotated out of the cutting plane again. The rotating-out process takes place by means of band guides on which additional alternating bending loads occur.

The mechanical loads of the saw band lead, over time, to material fatigue which is manifested by microcracks in the band material, wherein the number and length of said microcracks increases over time, until the saw band cracks, especially under load.

However, the situation of the band breaking during a sawing process should be avoided since, when a band breaks under load, the risk of an accident is particularly high since the workpiece may be damaged and since, in some cases, it may no longer be possible to remove a cracked saw band from the cutting channel. Therefore, there is a need to predict, before the beginning of a sawing process, whether the saw band will withstand the next sawing process, which typically lasts for several minutes, but in some cases even one to two hours, in the case of metal saws, without the band breaking.

This need to predict the remaining service life of the saw band is further considerably intensified in the case of an automatic sawing operation. It is obvious that, for example, in a situation of the band breaking at the beginning of a nightshift during which sawing is intended to be performed without an operator, a large amount of damage may be caused solely due to the long downtime in production caused as a result.

A prediction about the remaining service life of a saw band on the basis of typical saw band service lives and sawing processes that have already been carried out provides, as shown by experience, hardly usable results since the variation in the band service lives is very wide due to manufacturing tolerances, even amongst a quantity of saw bands of the same type.

Regular inspection of the saw band for visible cracks has not been found to be practical either, especially since production would have to be interrupted for this purpose.

Therefore, DE 10 2018 118 369 A1 has proposed predicting the remaining service life of a saw band in a bandsaw machine by way of monitoring the vibration behavior of the saw band clamped in the sawing machine by means of an inductive, capacitive, tactile or optical sensor during operation of the sawing machine. Some time before a band breaks, the vibration movement of the saw band within selected frequency ranges appears to intensify, and therefore identification of corresponding changes in the vibration behavior triggers a warning signal for imminent breaking of the band.

However, the vibration behavior of a saw band during operation is influenced by a large number of different influencing variables and boundary conditions. Therefore, it is not possible to readily reproduce the way in which the remaining service life of the saw band can be predicted from a change in amplitude of the band vibrations. Vibration effects that can be attributed to the material fatigue to be sensed are superimposed with vibrations and changes in vibration that have other causes.

In addition, a sensor for monitoring the vibration behavior of the saw band clamped in the sawing machine during operation of the sawing machine is susceptible to faults and requires a great deal of servicing or has to be a costly specialty product on account of the harsh environmental conditions.

SUMMARY

The present invention is therefore based on the object of providing a method for predicting the remaining service life of a saw band in a bandsaw machine and to a handsaw machine, which method and handsaw machine allow the behavior or properties of the saw band clamped in the sawing machine to be monitored in a different way and in so doing to be implemented with a robust and simple sensor system.

This object is achieved by a method having one of more of the features described herein and by a handsaw machine having one of more of the features described herein.

Preferred refinements of the method according to the invention and advantageous developments of the handsaw machine according to the invention are provided below and in the claims.

According to the present invention, as previously, the behavior or selected properties of the saw band clamped in the sawing machine is/are monitored by means of at least one sensor device during operation of the sawing machine for the method for predicting the remaining service life of a saw band in a handsaw machine, and changes in the behavior or in properties of the saw band over time established on the basis of measurement signals from the sensor device are used for making a prediction about the time at which a band will break. Whereas in the prior art a property of the saw band—the vibration behavior—is directly monitored by means of a sensor device in order to make a prediction about the time at which a band will break, indirect monitoring of the saw band takes place, i.e. components of the sawing machine are monitored which for their part are operatively connected to the saw band, according to the invention, specifically by way of changes to such components of the sawing machine being detected using the at least one sensor device. Conclusions can then be drawn about the behavior or the selected properties of the saw band from the corresponding measurement data.

This novel concept of monitoring the behavior or properties of the saw band during operation allows a robust and simple sensor system to be used, this not being possible in the case of direct monitoring of the vibration behavior of the saw band. However, the procedure according to the invention primarily allows a clearer data basis for predicting the situation of a band breaking or for predicting the remaining service life of the saw band since behavior patterns or properties of the saw band on which significantly fewer influencing variables act than on the vibration behavior of the saw band can be indirectly monitored.

The bandsaw machine according to the invention comprising a saw band running around at least two running wheels and tensioned between them and comprising a tensioning device for the saw band, which tensioning device acts on at least one of the running wheels and holds the tension of the saw band substantially constant by changing the distance between the running wheels, comprises, according to the invention, a sensor device for detecting changes to components of the sawing machine which are directly or indirectly operatively connected to the saw band, whereby the sensor device is suitable for carrying out the method according to the invention. A controller based evaluation unit for evaluating detected measurement values and generating a warning message or for outputting a prediction is likewise part of the bandsaw machine according to the invention.

A particularly advantageous way of implementing the method according to the invention involves monitoring a lengthening of the saw band by way of indirectly sensing said lengthening. This is because experiments by the applicant have shown that although saw bands of a specific type and specific dimensions lengthen at different rates during operation, the extent of the lengthening until a band breaks—with the band tension being held constant in each case—lies in a considerably narrower range than the variation in the rate of lengthening. Therefore, it suffices to carry out a few experiments using saw bands of a specific type in order to identify a limit value for the lengthening, there being a high probability that the band will break within a prespecified time interval when said limit value is reached and, respectively, a high probability that the band will not break having to be expected below said limit value. The usual variation in the total service life of saw bands of a specific type does not have any relevant influence on this. Since experience has shown that this variation lies within a range of +/−50%, the prediction according to the invention provides major advantages.

The lengthening of the saw band can particularly advantageously be—according to the present invention indirectly—monitored or detected by way of a change in travel at a tensioning device for the saw band. Since the saw band is retensioned in the event of a lengthening by way of a running roller being moved increasingly further outward by means of a tensioning device, it suffices very simply to monitor this change in travel at the tensioning device, for example using a cost-effective and robust travel sensor, in particular at least one rotary encoder, wire-actuated encoder or strain gauge. If the tensioning device is electromotively adjusted, the sensor device used may also be a drive designed as an electric motor with a position encoder, so that the change in travel at the tensioning device can be monitored without an additional sensor system, but rather by using the position encoder of the electric motor.

Another particularly advantageous implementation of the procedure according to the invention involves monitoring a band guiding device, wherein changes in a tension in the band guiding device or an elastic deformation of the band guiding device are detected.

As described at the outset, the band guiding device rotates the saw band in front of and behind the sawing region and therefore has to absorb the corresponding return forces of the tensioned saw band. A change in the return forces of the saw band can indicate, as experiments by the applicant have shown, imminent breaking of the band. This is generally the case when the change in the return forces accelerates, i.e. the torsional load on the saw band decreases in an accelerated manner.

The change in a tension in a band guiding device or an elastic deformation of the band guiding device can once again be very simply monitored by means of travel sensors, in particular by means of at least one strain gauge, or by means of force measuring transducers, which are all simple and robust measurement value sensors.

Therefore, by way of monitoring different components of the sawing machine which are operatively connected to the saw band, different properties of the saw band can be indirectly monitored, in particular a lengthening, preferably by way of monitoring the tensioning device or its drive mechanism, or a torsional load, preferably by way of monitoring tensions and/or elastic deformations of band guiding devices. It has been found here that there are absolute limit values for changes in travel, changes in tension or elastic deformations, it being possible to assume on the basis of statistics a specific minimum remaining service life when said absolute limit values are reached. In addition, there are relative limit values for changes to the detected components, i.e. limit values for an increasing rate of changes, it likewise being possible to assume a specific minimum remaining service life of the saw band when said relative limit values are reached. These relationships can be observed both in the lengthening of the saw band and in the decrease in the torsional load on said saw band.

In this respect, a change in travel at the tensioning device for the saw band can be monitored using the sensor device according to the invention, wherein a warning message is generated when a predetermined absolute limit value for a distance covered, which due to the constant band tension corresponds to the lengthening of the saw band, is reached or when a predetermined relative limit value for the change in travel is reached. This warning message can be directly output or further processed in the electronic data processing system of the bandsaw machine or the operator to make a prediction.

As an alternative or in addition, the sensor device according to the invention can also monitor a change in the tension in the band guiding device or an elastic deformation of the band guiding device in order to identify the decreasing torsional load on the saw band. A warning message can once again be generated at a predetermined relative limit value for the change and/or when a predetermined absolute limit value for the elastic deformation or tension is reached, said warning message being output as such or being output to the electronic data processing system of the bandsaw machine or the operator in order to be able to make a prediction.

The predetermined absolute limit value for a distance covered at the tensioning device and/or the elastic deformation of the band guiding device or the tension in the band guiding device is preferably ascertained by a series of experiments using saw bands of the same type and of the same dimensions at a constant band tension during no-load operation until the band breaks in a manner specific to the type and dimensions as a lower value for the distance or the elastic deformation or the tension, below which value there is a defined probability, for example of 90%, of the band not breaking.

In a corresponding manner, the predetermined relative limit value for the change in travel or for the change in the tension in the band guiding device or for the change in the elastic deformation of the band guiding device can be ascertained by a series of experiments using saw bands of the same type and of the same dimensions at a constant band tension during no-load operation until the band breaks in a manner specific to the type and dimensions as a lower value for the change, below which value there is a defined probability, for example of 90%, of the band not breaking.

BRIEF DESCRIPTION OF THE DRAWINGS

Exemplary embodiments of a method according to the invention and a bandsaw machine equipped according to the invention will be described and explained below with reference to the appended drawings, in which.

DETAILED DESCRIPTION

Figure 1:
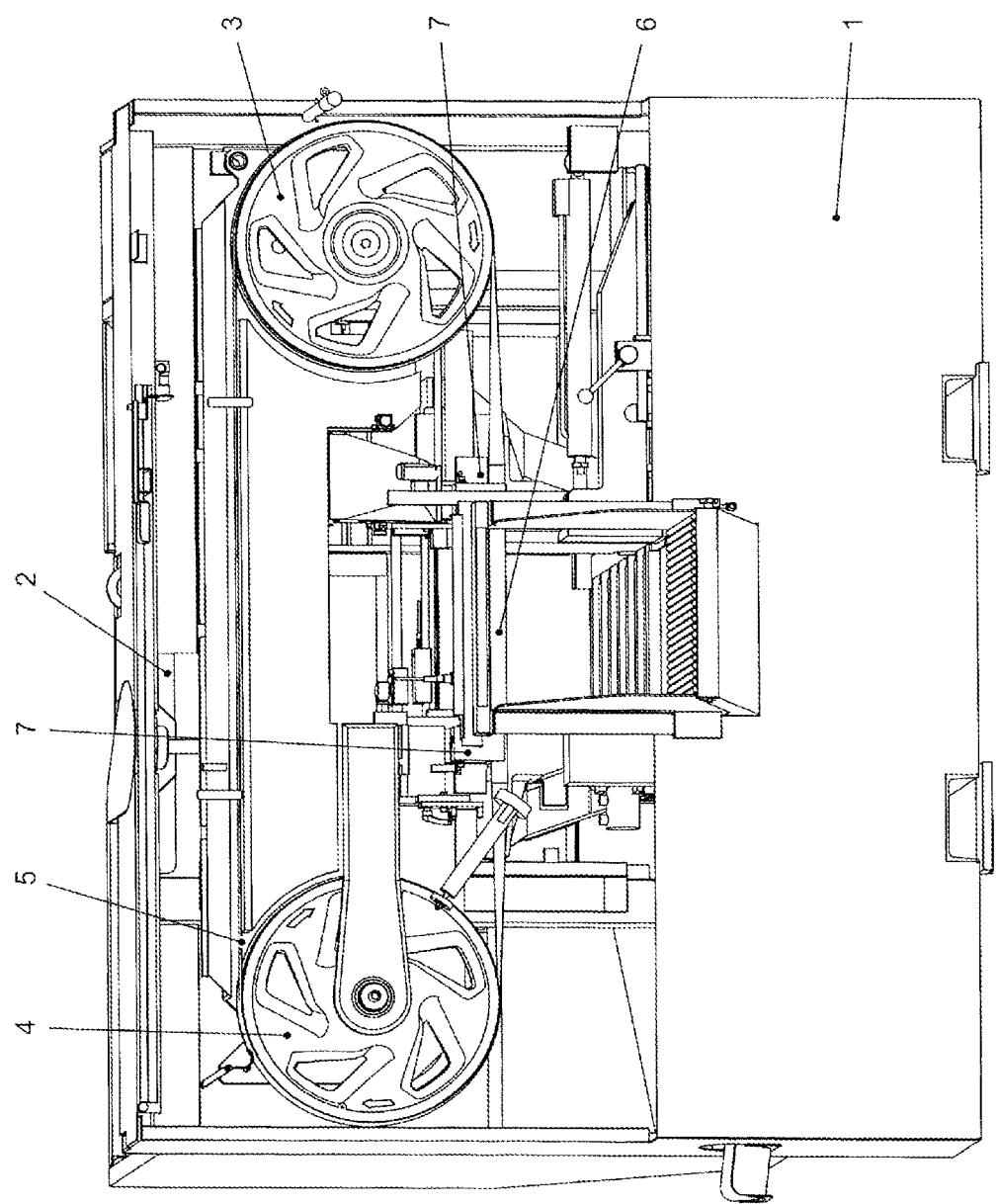
FIG. 1 shows a schematic view of a bandsaw machine.

FIG. 1 schematically shows a bandsaw machine comprising a saw lower part 1, onto which a workpiece to be sawn is placed, and a saw upper part 2, which can be moved up and down relative to the saw lower part. Two running wheels 3, 4, specifically a stationary running wheel 3 and an, in this case, horizontally movable running wheel 4, of which at least one is driven, are arranged in the saw upper part 2. A saw band 5 is tensioned around these running wheels 3, 4. In order to carry out the sawing movement, said saw band runs around the two running wheels 3, 4.

In a sawing region 6 in which the saw band 5 meets a workpiece by way of the saw upper part 2 being lowered, the saw band 5 is turned by means of two band guiding devices 7 from a revolving movement plane, which is parallel to the axles of the running wheels 3, 4 and is oriented horizontally in the present case, into a cutting plane, which is oriented vertically in the present case. According to the invention, sensor devices are provided both on the adjustable running wheel 4 and also on the band guiding devices 7, as will be explained in more detail below.

Figure 2:
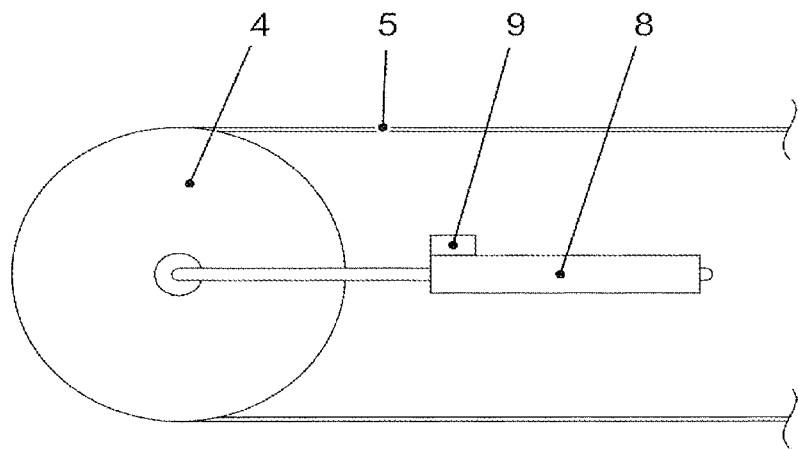
FIG. 2 shows a schematic illustration of a tensioning device of the bandsaw machine according to FIG. 1.

FIG. 2 shows a detail from FIG. 1, specifically the adjustable running wheel 4 for the saw band 5 and an associated tensioning device 8. In the present case, said tensioning device consists of a piston/cylinder unit in order to hydraulically move the adjustable running wheel 4 outward and to hold it with a prespecified hydraulic pressure, so that the saw band 5 is tensioned with a constant tension. When the saw band 5 lengthens, the running wheel 4 is readjusted, due to the hydraulic pressure acting on the tensioning device 8, until the tension of the saw band 5 has again reached the target value.

The tensioning device 8, more precisely the piston/cylinder unit, has located on it a travel sensor 9, which can be designed as a wire-actuated encoder and connects the cylinder to an axle of the running wheel 4 in order to monitor the magnitude of the distance that the running wheel 4 covers during retensioning. The change in an average speed of the readjusting movement could also be monitored in this way.

Figure 3:
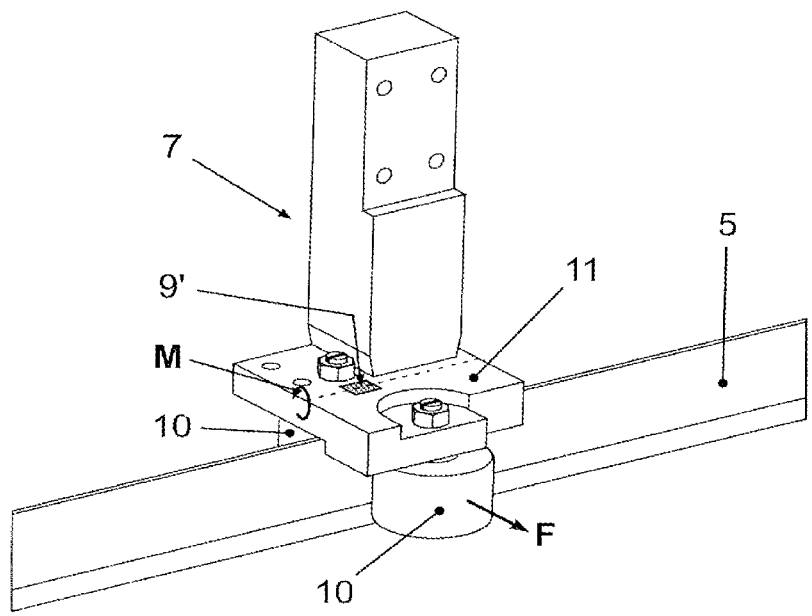
FIG. 3 shows a schematic illustration of a band guiding device of the bandsaw according to FIG. 1.

FIG. 3 is an illustration of a detail of one of the two band guiding devices 7 of the sawing machine from FIG. 1. This band guiding device 7 consists of two band guiding rollers 10, which roll on a side surface of the saw band 5 and which transmit the forces required for revolving the saw band 5 to said saw band, and a holding plate 11 on which the band guiding rollers 10 are held and mounted. Due to the return force of the saw band 5 against the revolving caused by the band guiding rollers 10, a torque M acts on the holding plate 11, said torque causing a slight elastic deformation of the holding plate 11. A change in this deformation, which change is caused in particular by a decrease in the torsional load on the saw band 5 and therefore a decrease in the torque M, can be detected by means of a travel sensor 9, which is designed as a strain gauge and is fitted to the holding plate 11 here.

Figure 4:
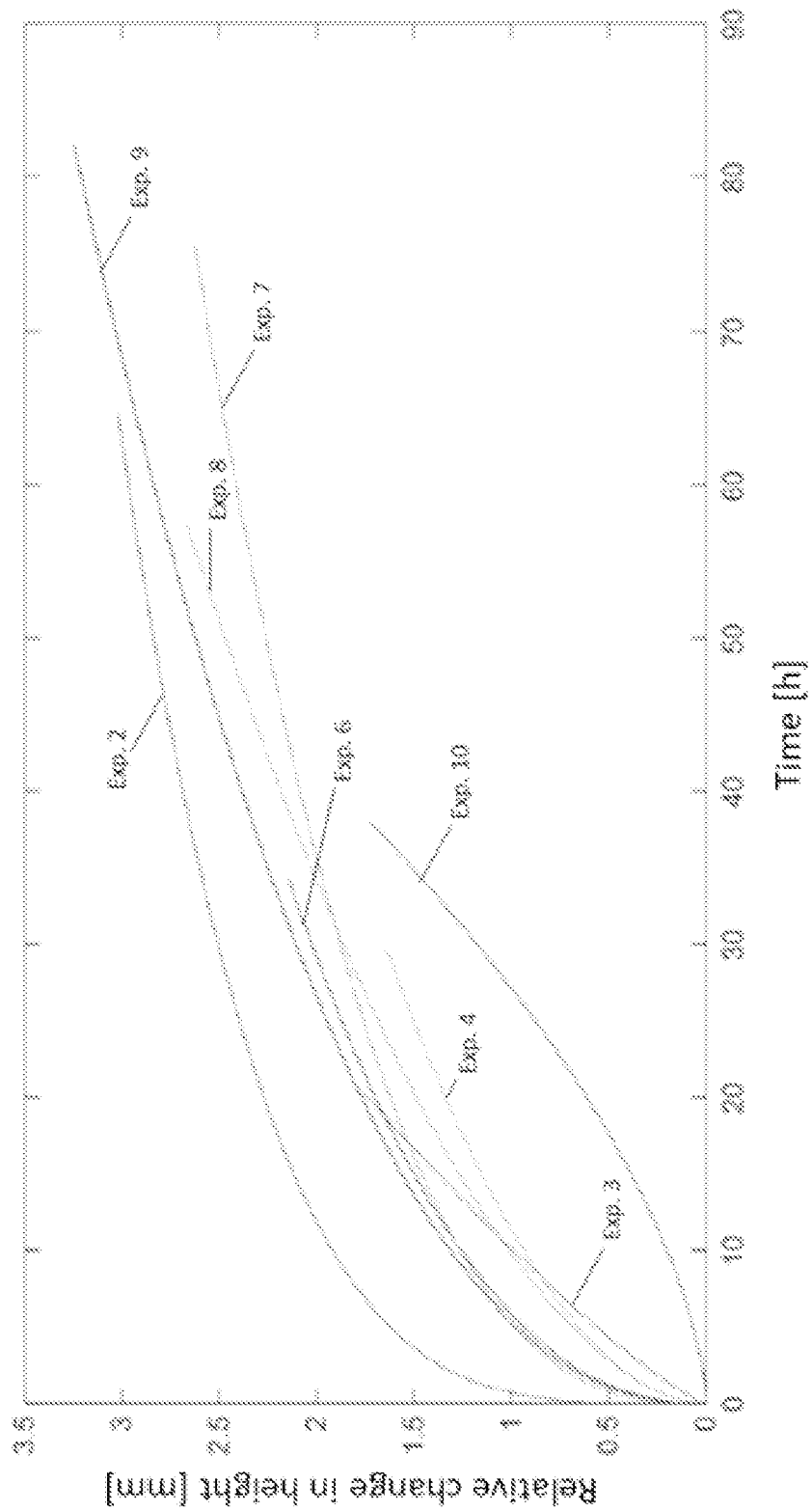
FIG. 4 shows measurement curves of an experiment using a plurality of saw bands of the same type, measured at the tensioning device of the bandsaw machine.

FIG. 4 shows a graph containing a plurality of measurement curves, each of which represents an experiment. The travel of an adjustment of the adjustable running wheel 4 with the tension of the saw band 5 held constant is plotted with respect to time. A plurality of saw bands in new condition were fitted into the same bandsaw machine and, respectively, onto the two running wheels 3, 4 and tensioned, after which the adjusting travel of the running wheel 4 was set to zero. The saw bands 5 were then operated on the sawing machine without load, that is to say without sawing a workpiece, until the band broke.

As can be seen with reference to FIG. 4, there was a large variation in the service life of the saw bands until the band broke, from approximately 20 hours to approximately 80 hours, even though saw bands of the same type and of the same dimensions were used, in the present case with a back height of 54 mm, on the same bandsaw machine in each case. However, according to the invention, it was found that the band always only breaks after a displacement travel of the adjustable running wheel 4 of at least 1.5 mm, irrespective of whether this was the case as early as after 20 hours or only after 30 hours.

Therefore, it is possible to make a prediction about the earliest time at which a band will break using extremely cost-effective and robust travel sensors which only have to measure to an accuracy of one tenth of a millimeter. In the present example, an absolute limit value for the distance covered of 1.4 to 1.5 mm could be used in order to be able to make a prediction that there is no need to worry about the band breaking within the next 2 to 3 hours with a high degree of probability.

Figure 5:
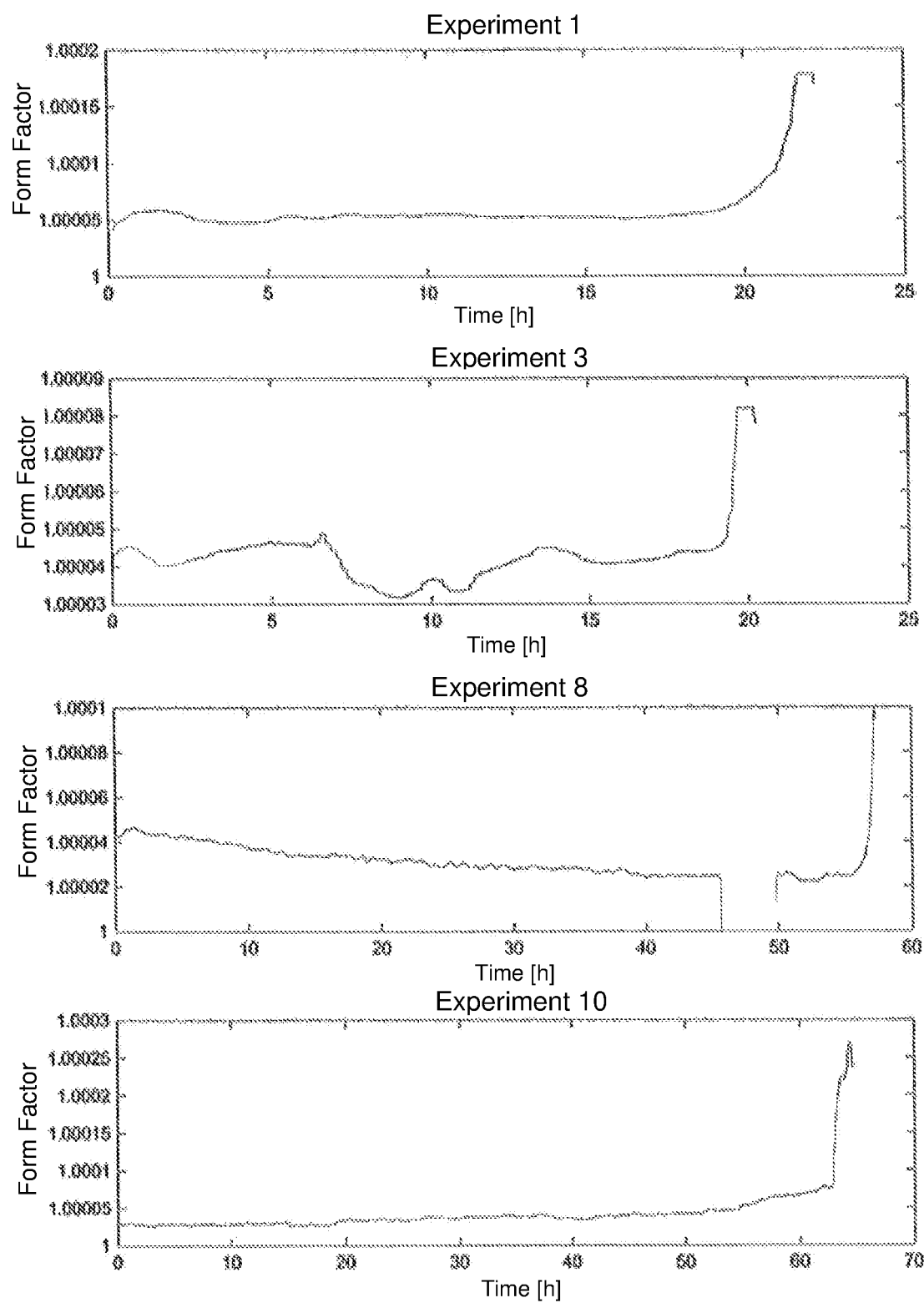
FIG. 5 shows measurement graphs of an experiment using a plurality of saw bands of the same type, measured at a band guiding device.

FIG. 5 shows measurement graphs of measurement values which originate from the travel sensor 9, configured as a strain gauge, on the holding plate 11 of the band guiding device 7 and have been converted into a form factor that corresponds to the tension in the holding plate 11. This form factor is plotted with respect to time in hours in the graphs. Here too, different saw bands of the same type and of the same dimensions have again been operated on the same bandsaw machine without load from the new condition until the band breaks.

As can be seen in FIG. 5, the values for the form factor exhibit a clear increase approximately 1 to 3 hours before the band breaks. This can be used in order to define an absolute limit value for the form factor, the probability of a band breaking within the next 1 to 3 hours being very high above said absolute limit value. As an alternative or in addition, a relative limit value for the change in the tension can also be defined, said relative limit value once again indicating that the form factor and therefore the tension in the holding plate 11 is changing in an accelerated manner and it can be expected that the band will break within 1 to 3 hours.

Therefore, it can be seen according to the invention that it is not at all necessary to directly detect the saw band in order to monitor properties or the behavior of the saw band during operation in the sawing machine, which properties and behavior produce a conclusion in respect of how long it would be until there is a risk of the band breaking and therefore allow a prediction to be made about the time at which a band will break. Rather, it suffices to detect changes to components of the sawing machine which are operatively connected to the saw band.

Furthermore, a simple relationship between a very probably imminent situation of the band breaking and an increasing lengthening of the saw band or a decreasing torsional load on said saw band during operation of the sawing machine has been identified within the scope of the present invention, wherein these properties of the saw band can be indirectly identified at components which are operatively connected to the saw band. Therefore, according to the invention, it is no longer necessary to directly monitor the saw band by means of sensor systems that are complicated and susceptible to faults.

LIST OF REFERENCE SIGNS

1 Saw lower part
2 Saw upper part
3 Running wheel (fixed)
4 Running wheel (adjustable)
5 Saw band
6 Sawing region
7 Band guiding device
8 Tensioning device
9 Travel sensor
10 Band guiding rollers
11 Holding plate
F Force
M Torque

The invention claimed is:

1. A method for predicting a remaining service life of a saw band (5) in a bandsaw machine, the method comprising:
   indirectly monitoring a behavior or properties of the saw band (5) clamped in the sawing machine during operation of the sawing machine using at least one sensor by detecting changes to components of the sawing machine which are operatively connected to the saw band (5), including detecting a change in travel at a tensioning device (8) for the saw band (5) using the at least one sensor;
   using changes in the behavior or in the properties of the saw band (5) over time established using measurement signals of the sensor to make a prediction about a time at which the saw band will break, and
   generating a warning message or a prediction for at least one of when a predetermined absolute limit value for a distance covered is reached or when a predetermined relative limit value for a change in travel is reached,
   wherein at least one of the predetermined absolute limit value for the distance covered at the tensioning device (8) or the predetermined relative limit value for the change in the travel is ascertained by a series of experiments using saw bands of a same type and same dimensions at a constant band tension during no-load operation until the band breaks in a manner specific to the type and dimensions as a lower value for the at least one of the distance or the change, below which value there is a defined probability of the band not breaking.

2. The method according to claim 1, wherein the monitoring includes indirectly sensing a lengthening of the saw band (5) using the sensor which is configured for indirectly sensing the lengthening of the saw band (5).

3. The method according to claim 1, wherein the sensor comprises at least one of a travel sensor (9), a rotary encoder, a wire-actuated encoder, a strain gauge, or a force measuring transducer.

4. The method according to claim 1, wherein the sensor comprises a position encoder on a drive of the tensioning device (8) which includes an electric motor with the position encoder.

5. The method according to claim 1, wherein the monitoring includes detecting a change in a tension in the band guiding device (7) or an elastic deformation of the band guiding device (7) using the sensor, and the method further includes generating a warning message or a prediction when at least one of a predetermined relative limit value for the change or a predetermined absolute limit value for the elastic deformation or tension is reached.

6. The method according to claim 5, wherein the predetermined absolute limit value for the elastic deformation of the band guiding device (7) or the tension in the band guiding device (7) is ascertained by a series of experiments using saw bands of a same type and same dimensions at a constant band tension during no-load operation until the band breaks in a manner specific to the type and dimensions as a lower value for the elastic deformation or the tension, below which value there is a defined probability of the band not breaking.

7. The method according to claim 5, wherein the predetermined relative limit value for the change in the tension in the band guiding device (7) or for the change in the elastic deformation of the band guiding device (7) is ascertained by a series of experiments using saw bands of a same type and same dimensions at a constant band tension during no-load operation until the band breaks in a manner specific to the type and dimensions as a lower value for the change, below which value there is a defined probability of the band not breaking.

8. A bandsaw machine comprising:
a saw band (5) running around at least two running wheels (3, 4) and tensioned between them;
a tensioner (8) for the saw band (5) that acts on at least one of the running wheels (4) and holds a tension of the saw band (5) substantially constant by changing a distance between the running wheels (3, 4);
a sensor configured to detect changes to components of the sawing machine which are directly or indirectly connected to the saw band (5); and
an evaluation unit configured to evaluate detected values and generate a warning message or a prediction prior to the saw band breaking by indirectly monitoring a behavior or properties of the saw band (5) clamped in the sawing machine during operation of the sawing machine using the sensor, including detecting a change in travel at the tensioner (8) for the saw band (5) using the sensor, and further configured to generate a warning message or a prediction for at least one of when a predetermined absolute limit value for a distance covered is reached or when a predetermined relative limit value for a change in travel is reached, wherein the at least one of the predetermined absolute limit value for the distance covered at the tensioner (8) or the predetermined relative limit value for the change in the travel is ascertained by a series of experiments using saw bands of a same type and same dimensions at a constant band tension during no-load operation until the band breaks in a manner specific to the type and dimensions as a lower value for the at least one of the distance or the change, below which value there is a defined probability of the band not breaking.

9. The bandsaw machine according to claim 8, wherein the sensor for detecting changes to components of the sawing machine is configured to indirectly sensing a lengthening of the saw band (5).

10. The bandsaw machine according to claim 8, wherein the sensor is further configured to monitor at least one of a change in a tension in a band guiding device (7) or an elastic deformation of the band guiding device (7).

11. The bandsaw machine according to claim 8, wherein the sensor includes at least one of a travel sensor (9), a rotary encoder, a wire-actuated encoder, a strain gauge, or a force measuring transducer.

\* \* \* \* \*